(12) United States Patent
Op't Roodt et al.

(10) Patent No.: US 8,595,889 B2
(45) Date of Patent: Dec. 3, 2013

(54) WIPER BLADE HAVING A CONNECTING ELEMENT

(75) Inventors: Inigo Op't Roodt, Hasselt (BE); Helmut Depondt, Heverlee (BE); Yves Janssis, Sint-Truiden (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 13/060,022

(22) PCT Filed: Jul. 24, 2009

(86) PCT No.: PCT/EP2009/059545
§ 371 (c)(1),
(2), (4) Date: Jul. 14, 2011

(87) PCT Pub. No.: WO2010/020517
PCT Pub. Date: Feb. 25, 2010

(65) Prior Publication Data
US 2011/0258802 A1    Oct. 27, 2011

(30) Foreign Application Priority Data
Aug. 21, 2008 (DE) .......................... 10 2008 041 405

(51) Int. Cl.
*B60S 1/40* (2006.01)

(52) U.S. Cl.
USPC .................................... 15/250.32; 15/250.43

(58) Field of Classification Search
USPC ............ 15/250.32, 250.43, 250.361, 15/250.44–250.48, 250.201
See application file for complete search history.

(56) References Cited

U.S. PATENT DOCUMENTS

| | | | |
|---|---|---|---|
| 5,204,574 A | 4/1993 | Kanno et al. | |
| 6,427,283 B1 | 8/2002 | Dietrich et al. | |
| 6,779,223 B1 | 8/2004 | Roekens | |
| 7,464,434 B2 * | 12/2008 | Chiang | 15/250.32 |
| 8,286,298 B2 * | 10/2012 | Kim | 15/250.32 |
| 2004/0074037 A1 | 4/2004 | Opt't Roodt | |
| 2009/0113653 A1 * | 5/2009 | Thienard | 15/250.32 |
| 2009/0188069 A1 | 7/2009 | Crabbe et al. | |

FOREIGN PATENT DOCUMENTS

| | | | | |
|---|---|---|---|---|
| DE | 102007021333 A1 * | 11/2008 | ............... | B60S 1/40 |
| GB | 2307599 A | 5/1997 | | |
| JP | 2003312451 A | 11/2003 | | |
| WO | 2008/003675 A1 | 1/2008 | | |
| WO | WO 2008003675 A1 * | 1/2008 | ............... | B60S 1/38 |
| WO | 2008/019903 A1 | 2/2008 | | |

OTHER PUBLICATIONS

WO2008003675A1 (machine translation), 2008.*
DE102007021333A1 (machine translation), 2008.*
PCT/EP2009/059545 International Search Report.

* cited by examiner

*Primary Examiner* — Mark Spisich
*Assistant Examiner* — Andrew A Horton
(74) *Attorney, Agent, or Firm* — Michael Best & Friedrich LLP

(57) ABSTRACT

The invention relates to a wiper blade (10) comprising a connecting element (26), which comprises a base element (28) and a hinge element (68), wherein the base element (28) has a first side part (30) and a second side part (32), which are joined transversely to a longitudinal direction (40) by locking means (54, 56) and centering means (46, 48, 50, 52) interlocking, and which are held together by side walls (72) of the hinge element (68). It is proposed that the hinge element (68) is an adapter cap (68) made of plastic which comprises on the insides of the side walls (72) thereof clips (86), which in the installed state engage in recesses (66) on the outer longitudinal sides of the side parts (30, 32).

17 Claims, 3 Drawing Sheets

WIPER BLADE HAVING A CONNECTING ELEMENT

BACKGROUND OF THE INVENTION

The invention is based on a wiper blade having a connecting.

DE 10 2006 031 514 A1 discloses a wiper blade having a connecting element for the articulated joining of the wiper blade to a wiper arm. The connecting element comprises a base element which is composed of two side parts and is joined together transversely with respect to a longitudinal direction of the wiper blade. For this purpose, use is made of mutually facing centering means in the form of projections on the one side part which fit into corresponding cutouts in the other side part. In the fitted state, the projections in the cutouts fix the side parts in the longitudinal direction with respect to each other and define the distance of longitudinal grooves transversely with respect to the wiper blade. Spring rails serving as a supporting element run in the longitudinal grooves, the longitudinal grooves being provided with cams which engage in cutouts in the spring rails and fix the connecting element in the longitudinal direction relative to the spring rails.

To the side of the projections and the cutouts, bearing surfaces are provided on the side parts, said bearing surfaces interacting with bearing surfaces on the other side part in each case. The bearing surfaces run at an inclination with respect to the upper limb of the longitudinal groove and face or face away from the longitudinal groove in an alternating manner in the longitudinal direction. In the fitted state, the bearing surfaces fix the side parts in both directions of the vertical axis. The bearing surfaces may also be arranged in a transverse plane, wherein two bearing surfaces in pairs form a concave or convex roof surface which matches a corresponding roof surface of another pair of bearing surfaces of the other side part in each case.

Furthermore, latching hooks running transversely with respect to the longitudinal direction are arranged on the upper limb of the longitudinal grooves of the side parts, said latching hooks engaging in latching depressions in the other side part and provisionally holding the side parts of the base element together. The two side parts of the base element are finally held together by a sheet-metal claw which, by means of the base thereof, covers the side parts and leads through side guides on the outside transversely with respect to the longitudinal direction. Said side guides are angled from the longitudinal sides of the base to lower limbs of the side parts, wherein tabs which are integrally formed on the side guides in longitudinal directions at least partially engage in the side facing away from the base under lateral cams which are arranged on the outer sides of the side parts. The tabs are bent under the cams during installation, and therefore the sheet-metal claw holds the side parts of the base element together and is secured in the direction of the vertical axis by the tabs.

SUMMARY OF THE INVENTION

According to the invention, the hinge element, which comprises a hub, a hinge bolt or hinge pin, is an adapter cap which is made from plastic and, on the inner sides of the side walls thereof, has clips. The latter, in the fitted state, engage in recesses on the outer longitudinal sides of the side parts. The adapter cap can be produced in a simple manner by injection molding and can easily be fitted rapidly without additional tools by being clipped onto the base element. Furthermore the adapter cap has two functions. It firstly bears the hub or the hinge bolt or the hinge pin and secondly protects the connecting element from external influences, and provides the wiper blade with a harmonious design.

The clip connection can be designed to be highly robust. For this purpose, it is proposed, according to one refinement, that, on the edge of the recesses, the side parts have reinforcements which protrude partially into clearances in the side walls of the covering cap above the clips. This results in the clips being substantially covered by the recesses such that said clips cannot be unintentionally detached, while taking up little construction space.

The side parts of the base element are securely held together by the side walls of the adapter cap. This can be made even more certain if the side walls are connected to each other by transverse walls between the clips and the hub. This results in a very stiff conception. The clips can nevertheless be easily fitted, since the end sides of the adapter cap have connecting profiles for spoiler parts, said connecting profiles having a certain degree of flexibility transversely with respect to the longitudinal direction of the wiper blade.

The adapter cap is expediently fixed in the longitudinal direction relative to the base element by having a hub which runs transversely or a comparable structural element which, on the outer circumference thereof toward the base element, has two depressions in which centering cams of the base element engage. According to one refinement of the invention, a pressure web is provided on the hub between the depressions, said pressure web, in the fitted state, pressing onto pressure points on mutually facing tabs of the side parts of the base element. In the process, the tabs are pressed against a head strip of a wiper strip of the wiper blade and therefore said tabs are fixed relative to the connecting element and to the spring rails.

If the adapter cap has a hub which serves to connect a wiper arm in accordance with the side lock principle, it is expedient for recesses to be provided in the side walls of the adapter cap in the longitudinal direction on both sides of the hub. An angled end of a bridge of the wiper arm engages in the recesses in the operating position. The relative lateral position between the wiper blade and wiper arm is therefore locked in the operating position. In the process, it is expedient for small low-friction contact surfaces in the form of ribs to be provided between the angled end of the bridge and the recess.

BRIEF DESCRIPTION OF THE DRAWINGS

Further advantages emerge from the description below of the drawing. An exemplary embodiment of the invention is illustrated in the drawing. The drawing, the description and the claims contain numerous features in combination. A person skilled in the art will expediently also consider the features individually and put them together to form meaningful further combinations.

In the drawing.

DETAILED DESCRIPTION

Figure 4:
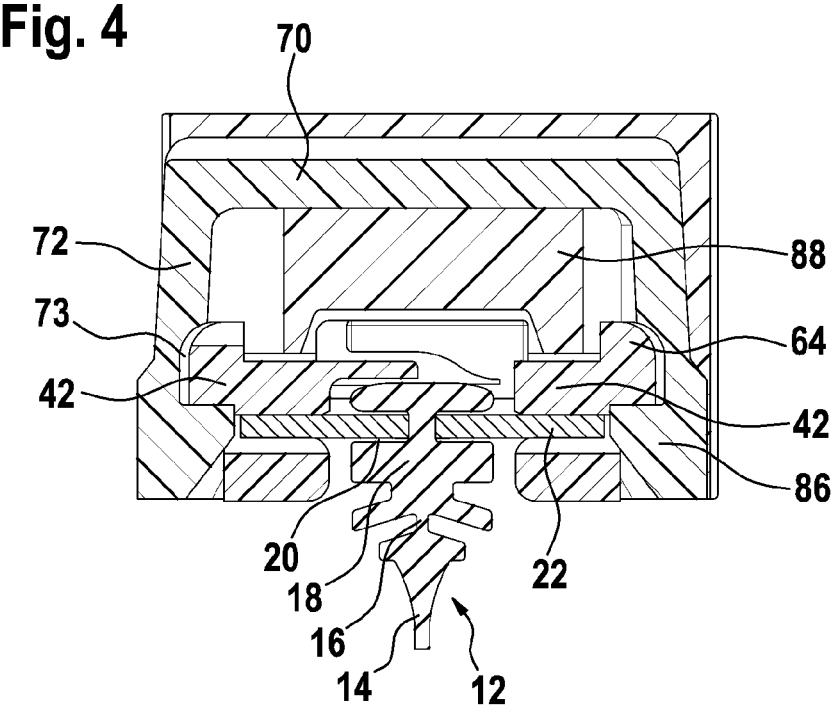
FIG. 4 shows a cross section corresponding to the line IV-IV in FIG. 1.
Figure 5:
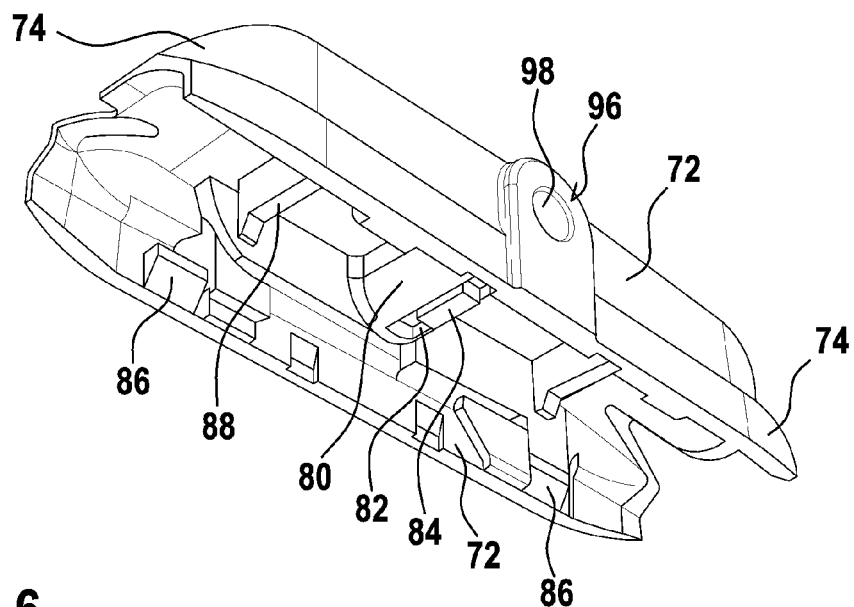
FIG. 5 shows a perspective view of an adapter cap of the connecting element from below.
Figure 6:
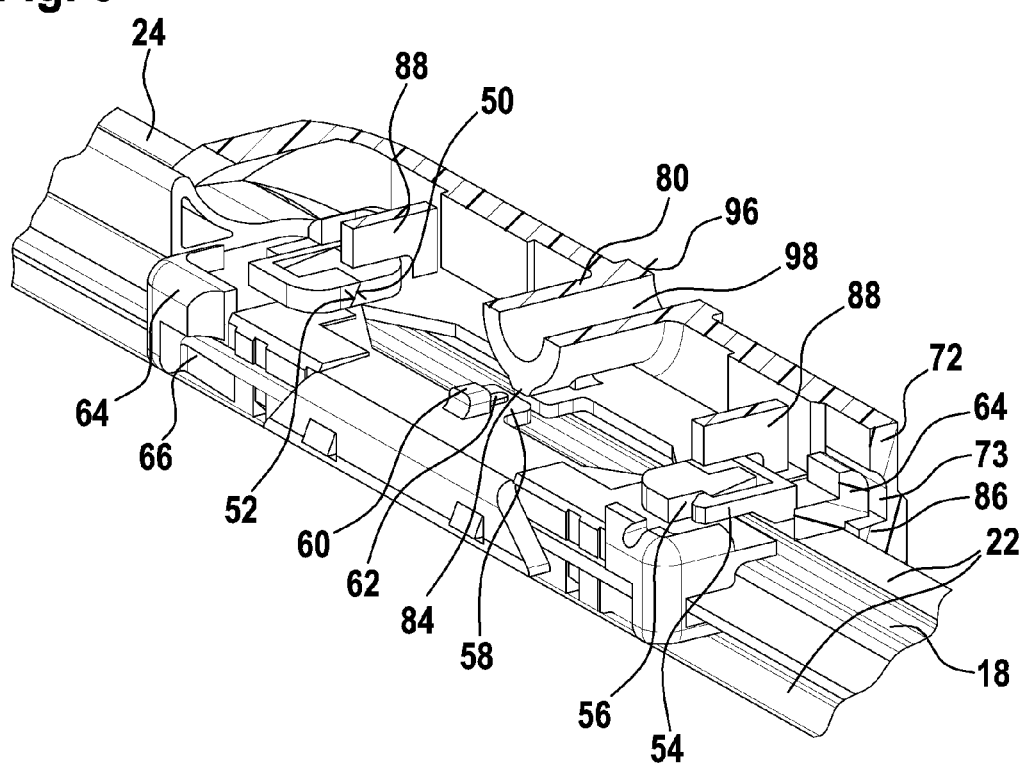
FIG. 6 shows a perspective view of a wiper blade with an adapter cap sectioned by a bearing axis and a longitudinal center plane.

A wiper blade 10 comprises a wiper strip 12 with a wiper lip 14 which is connected via a tilting web 16 to a head strip 18 (FIG. 4). The head strip 18 has two longitudinal grooves 20 into which spring rails 22 are inserted as supporting element. Said spring rails protrude laterally for a distance out of the longitudinal grooves 20 and, in said regions, bear spoiler parts 24 and a connecting element 26 which is fixed on the spring rails 22 between the spoiler parts 24. The end sides of the connecting element 26 have transition profiles 74 with which said connecting element overlaps the spoiler parts 24 for a distance.

The connecting element 26 comprises a base element 28 and a hinge element which is designed as an adapter cap 68. The base element 28 has two side parts 30, 32. The latter, by means of longitudinal grooves 34, surround those parts of the spring rails 22 which protrude laterally out of the longitudinal grooves 20 of the head strip 18. The longitudinal grooves are provided with cams 36 which engage in cutouts 38 in the spring rails 22 and therefore fix the base element 28 in the longitudinal direction 40 relative to the spring rails 22.

The longitudinal groove 34 is bounded by an upper limb 42 and by a lower limb 44. On the mutually facing longitudinal sides, expediently in the vicinity of the ends thereof, the upper limbs 42 of the side parts 30, 32 have projections 46 which fit into corresponding cutouts 48 in the other part 30, 32 in each case. The side parts 30, 32 are therefore identical, thus resulting in a small number of parts.

Bearing surfaces 50 and 52 are respectively arranged in the vicinity of the projections 46 and of the cutouts 48. The bearing surfaces 52 in pairs form a convex roof shape, which runs in the longitudinal direction 40 of the wiper blade 10, and match the bearing surfaces 50 which form a concave roof shape. The side parts 30, 32 are therefore mutually fixed in the direction of a vertical axis which runs perpendicularly to the longitudinal direction 40 and to the plane of the spring rails 22.

During installation, the side parts 30, 32 are temporarily held together by a clip connection which comprises latching hooks 54. During installation, the latter latch into latching depressions 56 in the other side part 30, 32 in each case. The side parts 30, 32 are finally held together laterally by an adapter cap 68, the side walls 72 of which surround the side parts 30, 32. A top wall 70 joins the side walls 72. During installation, clips 86 on the inner sides of the side walls 72 latch into recesses 66 on the outer sides of the side parts 30, 32. Reinforcements 64 which form a good support for the clips 86 are provided on the edge of the recesses 66 which are expediently arranged on the ends of the side parts 30, 32. The reinforcements 64 project into cutouts 73 in the side walls 72, thus producing a fixed clip connection while requiring little space.

In the central region of the side parts 30, 32, a centering cam 60 is provided on the upper limbs 42 of the longitudinal grooves 20 toward the adapter cap 68 and engages in corresponding depressions 82 in the adapter cap 68. The depressions 82 are provided on the lower side of a hub 80 which, running transversely with respect to the longitudinal direction 40, joins the side walls 72 of the adapter cap 68. Between the depressions 82 there is a pressure web 84 which, in the fitted state of the adapter cap 68, presses against the head strip 18 of the wiper strip 12 via pressure points 62 of the side parts 30, 32. The pressure points 62 are located in the vicinity of the centering cams 60 and are integrally formed on tabs 58 which are arranged opposite one another on the upper limbs 42 of the side parts 30, 32. In order to stiffen the adapter cap 68, transverse walls 88 which are integrally formed on the side walls 72 of the adapter cap 68 are expediently provided between the clips 86 and the hub 80.

According to the exemplary embodiment, the adapter cap 68 has the hub 80 as hinge part. However, it is also possible for the adapter cap 68 to have pins or a hinge bolt as hinge parts. The adapter cap 68 therefore carries out two functions, namely to join the hinge part, the hub 80, to the wiper blade 10 and secondly to outwardly protect the joining parts in a harmonious design.

Figure 1:
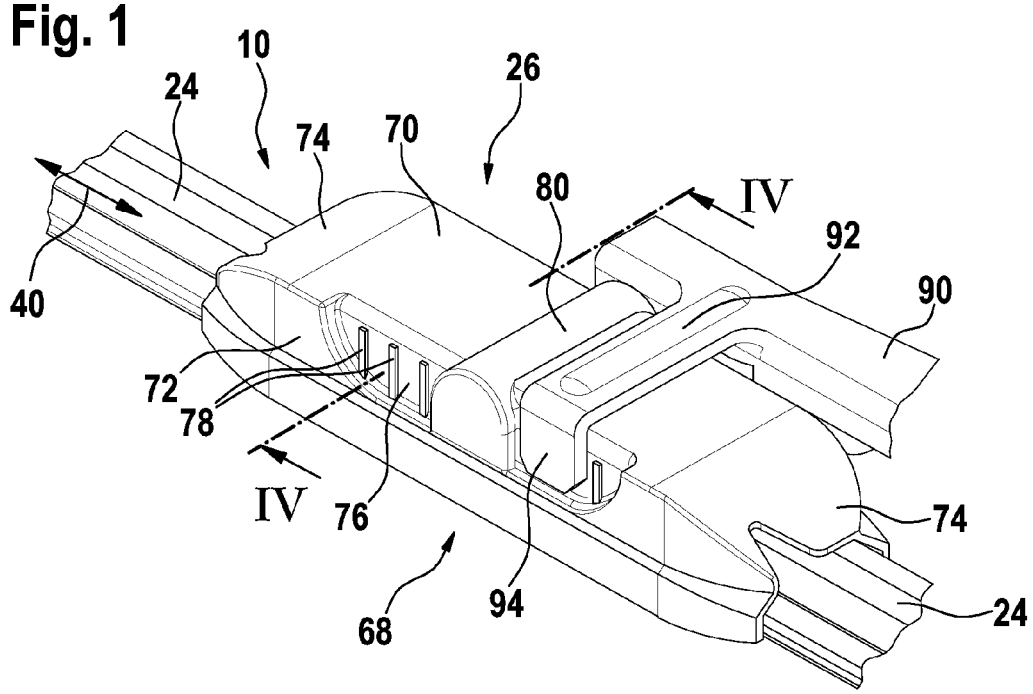
FIG. 1 shows a perspective view of a wiper blade according to the invention in the region of a connecting element.
Figure 2:
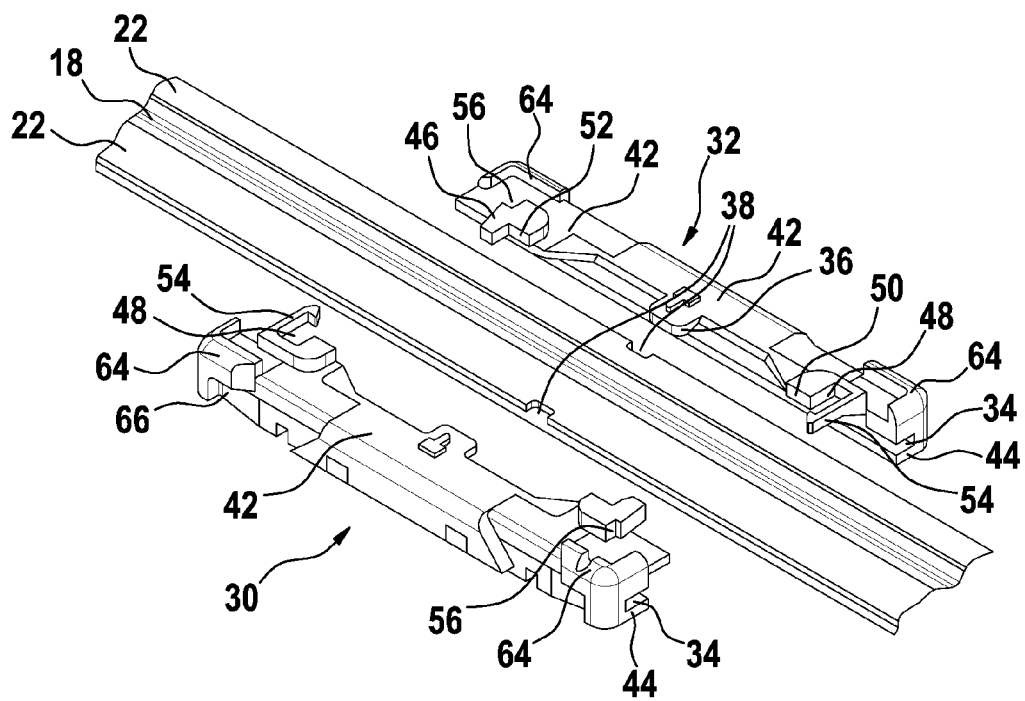
FIG. 2 shows a perspective view of a wiper blade according to FIG. 1 at the beginning of the installation of the connecting element.
Figure 3:
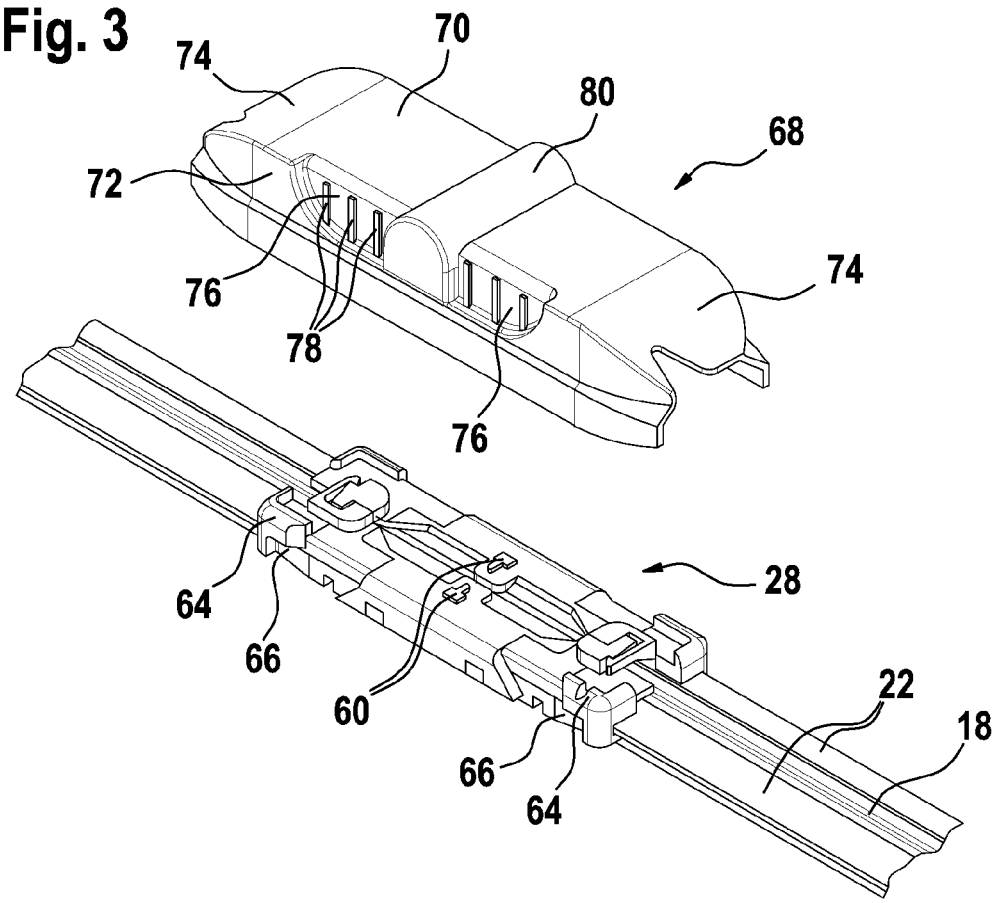
FIG. 3 shows a perspective view of a wiper blade according to FIG. 1 during the second installation step of the connecting element.

The exemplary embodiment shows an adapter cap 68 with the hub 80 in order to join the wiper blade 10 in accordance with the side lock principle to a wiper arm, of which only a joining element 90 is illustrated. The hub 80 has a bearing bore 98 to receive a bearing pin (not visible). Furthermore, said hub protrudes a little with respect to the joining element 90 and, on the protruding end side, has a run-on surface 96 for the joining element 90. Recesses 76 are provided in the side walls 72 of the adapter cap 68. Said recesses serve to receive an angled end 94 of a bridge 92 which runs offset and parallel to the hub 80 and to the driving side of the joining element 90 and is joined to the joining element 90. In the operating position of the wiper arm (FIG. 1), the bridge 92 uses the angled end 94 to secure the lateral position of the wiper blade 10 relative to the wiper arm. In order to be able more easily to keep to the required tolerances and to improve the contact between the angled end 94 and the adapter cap 68, flat, narrow ribs 78 are arranged in the recess.

The invention claimed is:

1. A wiper blade (10) having a connecting element (26) which comprises a base element (28) and a hinge element (68), wherein the base element (28) has a first side part (30) and a second side part (32) which are joined together transversely with respect to a longitudinal direction (40) by latching means (54, 56) and centering means (46, 48, 50, 52) interlocking, and which are held together by side walls (72) of the hinge element (68), characterized in that the hinge element (68) is an adapter cap (68) which is made from plastic and, on the inner sides of the side walls (72) thereof, has clips (86) which, in a fitted state, engage in recesses (66) on outer longitudinal sides of the side parts (30, 32), wherein, in the region of the recesses (66), the side parts (30, 32) have reinforcements (64) which extend away from the clips (86) and partially project into clearances (73) in the side walls (72) of the adapter cap (68) above the clips (86).

2. A wiper blade (10) as claimed in claim 1, characterized in that the side walls (72) of the adapter cap (68) are connected to each other between a hinge part (80) and the clips (86) by transverse walls (88).

3. A wiper blade (10) as claimed in claim 1, characterized in that the adapter cap (68) has as a hinge part a hub (80) which runs transversely and, on an outer circumference thereof toward the base element (28), has two depressions (82) in which centering cams (60) of the base element (28) engage.

4. A wiper blade (10) as claimed in claim 3, characterized in that, in the region of the centering cams (60), the side parts (30, 32) have mutually facing tabs (58) which, on a side facing the hub (80), have pressure points (62) via which, in the fitted state, a pressure web (84), which is provided on the hub (80) between the depressions (82), presses the tabs (58) against a head strip (18) of a wiper strip (12).

5. A wiper blade (10) as claimed in claim 3, characterized in that the adapter cap (68), in the side walls (72) thereof, has recesses (76) in the longitudinal direction (40) symmetrically with respect to the hub (80) for an angled end (94) of a bridge (92) of a joining element (90).

6. A wiper blade (10) as claimed in claim 5, characterized in that ribs (78) are provided in the recesses (76) in the adapter cap (68).

7. A wiper blade (10) as claimed in claim 1, characterized in that the side walls (72) of the adapter cap (68) are connected to each other between a hinge part (80) and the clips (86) by transverse walls (88).

8. A wiper blade (10) as claimed in claim 7, characterized in that the adapter cap (68) has as a hinge part a hub (80) which runs transversely and, on an outer circumference thereof toward the base element (28), has two depressions (82) in which centering cams (60) of the base element (28) engage.

9. A wiper blade (10) as claimed in claim 8, characterized in that, in the region of the centering cams (60), the side parts (30, 32) have mutually facing tabs (58) which, on a side facing the hub (80), have pressure points (62) via which, in the fitted state, a pressure web (84), which is provided on the hub (80) between the depressions (82), presses the tabs (58) against a head strip (18) of a wiper strip (12).

10. A wiper blade (10) as claimed in claim 9, characterized in that the adapter cap (68), in the side walls (72) thereof, has recesses (76) in the longitudinal direction (40) symmetrically with respect to the hub (80) for an angled end (94) of a bridge (92) of a joining element (90).

11. A wiper blade (10) as claimed in claim 10, characterized in that ribs (78) are provided in the recesses (76) in the adapter cap (68).

12. A connecting element (26) for use with a wiper blade, the connecting element comprising a base element (28) and a hinge element (68), wherein the base element (28) has a first side part (30) and a second side part (32) which are joined together transversely with respect to a longitudinal direction (40) by latching means (54, 56) and centering means (46, 48, 50, 52) interlocking, and which are held together by side walls (72) of the hinge element (68), characterized in that the hinge element (68) is an adapter cap (68) which is made from plastic and, on the inner sides of the side walls (72) thereof, has clips (86) which, in a fitted state, engage in recesses (66) on outer longitudinal sides of the side parts (30, 32), wherein, in the region of the recesses (66), the side parts (30, 32) have reinforcements (64) which extend away from the clips (86) and partially project into clearances (73) in the side walls (72) of the adapter cap (68) above the clips (86).

13. A connecting element (26) as claimed in claim 12, characterized in that the side walls (72) of the adapter cap (68) are connected to each other between a hinge part (80) and the clips (86) by transverse walls (88).

14. A connecting element (26) as claimed in claim 12, characterized in that the adapter cap (68) has as a hinge part a hub (80) which runs transversely and, on an outer circumference thereof toward the base element (28), has two depressions (82) in which centering cams (60) of the base element (28) engage.

15. A connecting element (26) as claimed in claim 14, characterized in that, in the region of the centering cams (60), the side parts (30, 32) have mutually facing tabs (58) which, on a side facing the hub (80), have pressure points (62) via which, in the fitted state, a pressure web (84), which is provided on the hub (80) between the depressions (82), is configured to press the tabs (58) against a head strip (18) of a wiper strip (12).

16. A connecting element (26) as claimed in claim 14, characterized in that the adapter cap (68), in the side walls (72) thereof, has recesses (76) in the longitudinal direction (40) symmetrically with respect to the hub (80) for an angled end (94) of a bridge (92) of a joining element (90).

17. A connecting element (26) as claimed in claim 16, characterized in that ribs (78) are provided in the recesses (76) in the adapter cap (68).

\* \* \* \* \*